(12) United States Patent
Namikawa et al.

(10) Patent No.: US 12,448,225 B2
(45) Date of Patent: Oct. 21, 2025

(54) ARTICLE SORTING METHOD AND ARTICLE SORTING FACILITY

(71) Applicant: Daifuku Co., Ltd., Osaka (JP)

(72) Inventors: Makoto Namikawa, Hinocho (JP); Manabu Onayama, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 43 days.

(21) Appl. No.: 18/281,741

(22) PCT Filed: Feb. 25, 2022

(86) PCT No.: PCT/JP2022/007993
§ 371 (c)(1),
(2) Date: Sep. 12, 2023

(87) PCT Pub. No.: WO2022/196299
PCT Pub. Date: Sep. 22, 2022

(65) Prior Publication Data
US 2024/0158180 A1    May 16, 2024

(30) Foreign Application Priority Data

Mar. 17, 2021    (JP) ................................ 2021-044055

(51) Int. Cl.
*B65G 47/76*    (2006.01)
*B65G 47/84*    (2006.01)

(52) U.S. Cl.
CPC ......... *B65G 47/766* (2013.01); *B65G 47/844* (2013.01)

(58) Field of Classification Search
CPC .................................................. B65G 47/844

USPC ....................................................... 198/370.02
See application file for complete search history.

(56) References Cited

U.S. PATENT DOCUMENTS

| | | | | |
|---|---|---|---|---|
| 5,027,939 A * | 7/1991 | Kilper | .................. | B65G 47/844 198/890 |
| 7,779,986 B2 * | 8/2010 | Enomoto | ............. | B65G 47/844 198/370.02 |
| 8,069,969 B2 * | 12/2011 | Vlug | .................... | B65G 47/844 198/370.02 |
| 2006/0207858 A1 * | 9/2006 | Veit | ....................... | B65G 47/844 198/370.02 |
| 2008/0149459 A1 * | 6/2008 | Neiser | .................... | B65G 47/34 198/370.02 |
| 2014/0360838 A1 * | 12/2014 | Wilkins | ................. | B65G 47/46 198/370.02 |
| 2018/0022555 A1 * | 1/2018 | Maines | ................ | B65G 47/766 198/370.02 |
| 2023/0257212 A1 * | 8/2023 | Grobben | ............... | B65G 43/08 198/370.02 |

FOREIGN PATENT DOCUMENTS

JP         201613920 A        1/2016

* cited by examiner

*Primary Examiner* — James R Bidwell
(74) *Attorney, Agent, or Firm* — The Webb Law Firm

(57) ABSTRACT

In a case where an article (A) is advanced along an inclined transport direction (C) by use of an article transverse-pushing body (4) configured to move along a main transport direction (T) and to be movable in a width direction (W) perpendicular to the main transport direction (T), the article transverse-pushing body (4) is accelerated in the width direction (W) in a sorting region (B) and then inertially moved such that the article transverse-pushing body (4) thus moving inertially is brought into contact with the article (A).

8 Claims, 9 Drawing Sheets

Fig.6
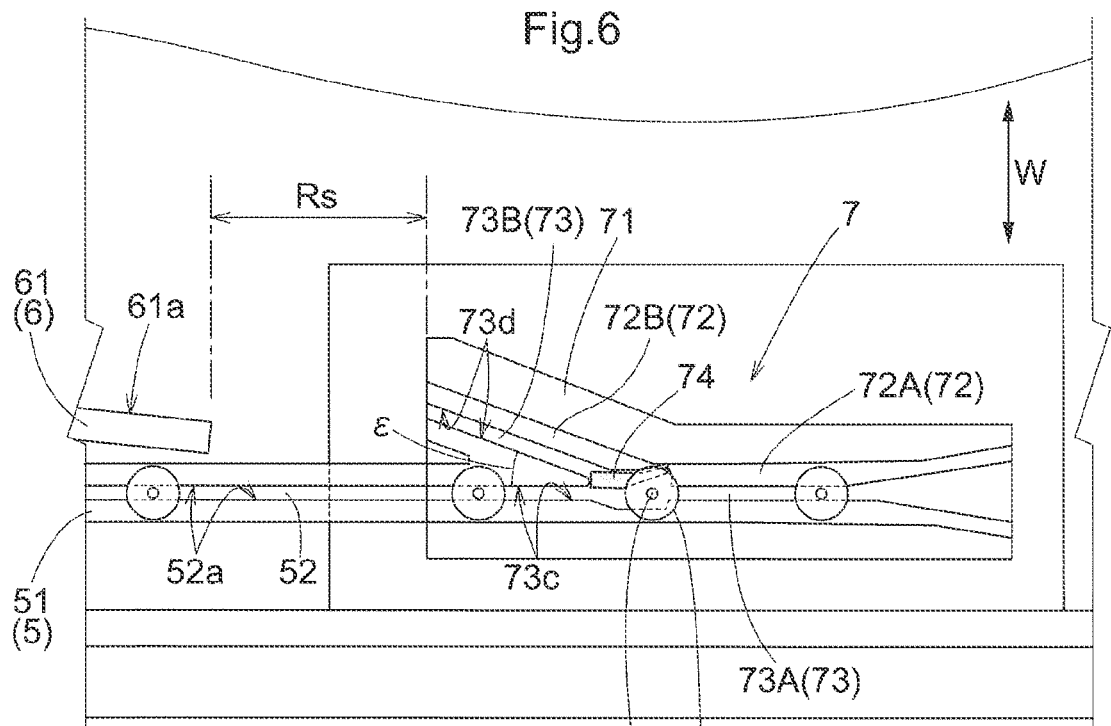
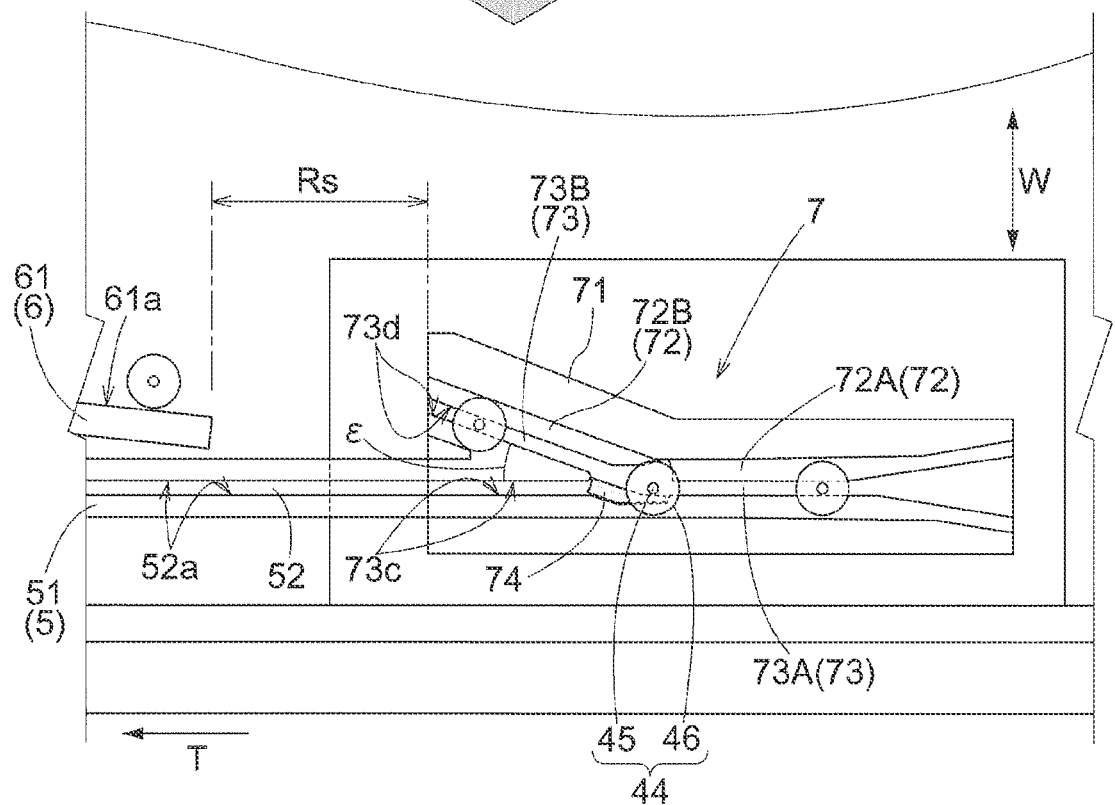

ARTICLE SORTING METHOD AND ARTICLE SORTING FACILITY

CROSS-REFERENCE TO RELATED APPLICATIONS

This application is the United States national phase of International Application No. PCT/JP2022/007993 filed Feb. 25, 2022, and claims priority to Japanese Patent Application No. 2021-044055 filed Mar. 17, 2021, the disclosures of which are hereby incorporated by reference in their entireties.

BACKGROUND OF THE INVENTION

Field of the Invention

The present invention relates to an article sorting method and an article sorting facility.

Description of Related Art

In the field of distribution, an article sorting facility is used to transport a plurality of articles different in outer shape and size in a mixed manner and to sort the plurality of articles. One example of such an article sorting facility is disclosed in Japanese Unexamined Patent Application Publication No. 2016-13920 (Patent Literature 1). An article sorting facility (a transport facility 1) in Patent Literature 1 includes an article support (a slat 2) configured to transport an article along a main transport direction, and an article transverse-pushing body (an article push-out shoe 3) provided slidably in a width direction relative to the article support. The article sorting facility is configured to sort an article by causing a course for the article to branch depending on whether the article is advanced just straight along the main transport direction or advanced along an inclined transport direction inclined from the main transport direction.

In the article sorting facility in Patent Literature 1, the sorting is performed by use of the article transverse-pushing body (the article push-out shoe 3) configured to slide in the width direction. At this time, in a state where the article transverse-pushing body is guided by an inclined guide body (a branch guide rail 6), the article transverse-pushing body makes first contact with an article as a sorting target in a region between LM1 and LM2 (H1 and H2) illustrated in FIG. 6 in Patent Literature 1. In such a configuration, the article transverse-pushing body configured to move along the main transport direction together with the article support makes contact with the article in a state where the article transverse-pushing body receives a reaction force from the inclined guide body, so that a large force acts on the article when the article transverse-pushing body makes contact with the article. This consequently causes such a problem that the article greatly rotates or falls down in some cases.

PATENT LITERATURE

Patent Literature 1: Japanese Unexamined Patent Application Publication No. 2016-13920

SUMMARY OF THE INVENTION

In view of this, in a case where sorting is performed by causing the course for an article to branch depending on whether the article is advanced just straight along the main transport direction or advanced along the inclined transport direction, it is desired to avoid the article from falling down or excessively rotating.

An article transport method according to this disclosure is an article sorting method for sorting an article transported along a main transport direction by selectively advancing the article along an inclined transport direction inclined from the main transport direction in a predetermined sorting region, and the article sorting method includes, in a case where the article is advanced along the inclined transport direction by use of an article transverse-pushing body configured to move along the main transport direction and to be movable in a width direction perpendicular to the main transport direction, accelerating the article transverse-pushing body in the width direction in the sorting region to inertially move the article transverse-pushing body such that the article transverse-pushing body thus moving inertially is brought into contact with the article.

Further, an article transport facility according to this disclosure is an article sorting facility for sorting an article by causing a course for the article to branch in a predetermined sorting region depending on whether the article is advanced straight along a main transport direction or advanced along an inclined transport direction inclined from the main transport direction, and the article transport facility includes: an article support forming a transport surface moving along the main transport direction and configured to support the article placed on the transport surface; and a plurality of article transverse-pushing bodies disposed to be aligned along the main transport direction such that each of the article transverse-pushing bodies is provided movably relative to the article support in a width direction perpendicular to the main transport direction. In a case where the article is advanced along the inclined transport direction, the article transverse-pushing bodies are accelerated in the width direction in the sorting region to be moved inertially such that the article transverse-pushing bodies thus moving inertially are brought into contact with the article.

With these configurations, in a case where the article is advanced along the inclined transport direction, the article transverse-pushing body moving inertially but not guided by the inclined guide body yet is brought into contact with the article, so that the article transverse-pushing body makes contact with the article in a state where the article transverse-pushing body receives no reaction force from the inclined guide body. Because of this, a force to act on the article from the article transverse-pushing body at the time of first contact is restrained to be small, thereby making it possible to avoid the article from falling down or rotating excessively.

Further features and advantages of the technology according to this disclosure will become clearer by the following illustrative and nonlimiting description of embodiments to described with reference to the drawings.

BRIEF DESCRIPTION OF THE DRAWINGS

FIG. 6 is a function explanatory view of a sorting mechanism;

DESCRIPTION OF THE INVENTION

The following will describe an embodiment of an article sorting facility with reference to the drawings. An article sorting facility 1 is used in a distribution warehouse, for example, to transport a plurality of articles A different in outer shape, size, weight, or the like in a mixed manner and sort the plurality of articles A. The article sorting facility 1 in the present embodiment is constituted by a sliding-shoe slat conveyor.

Figure 1:
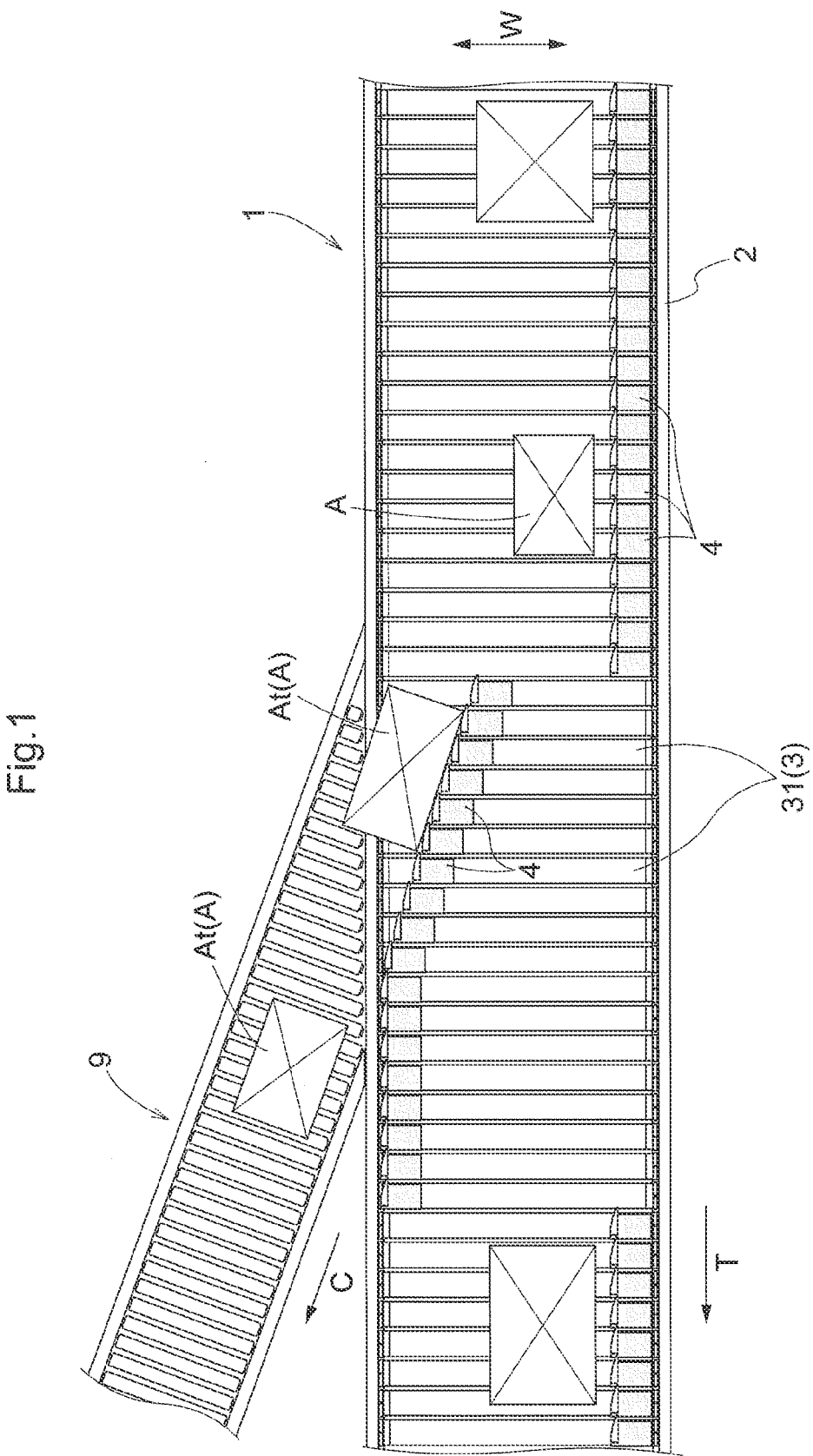
FIG. 1 is a plan view of an article sorting facility according to an embodiment.
Figure 2:
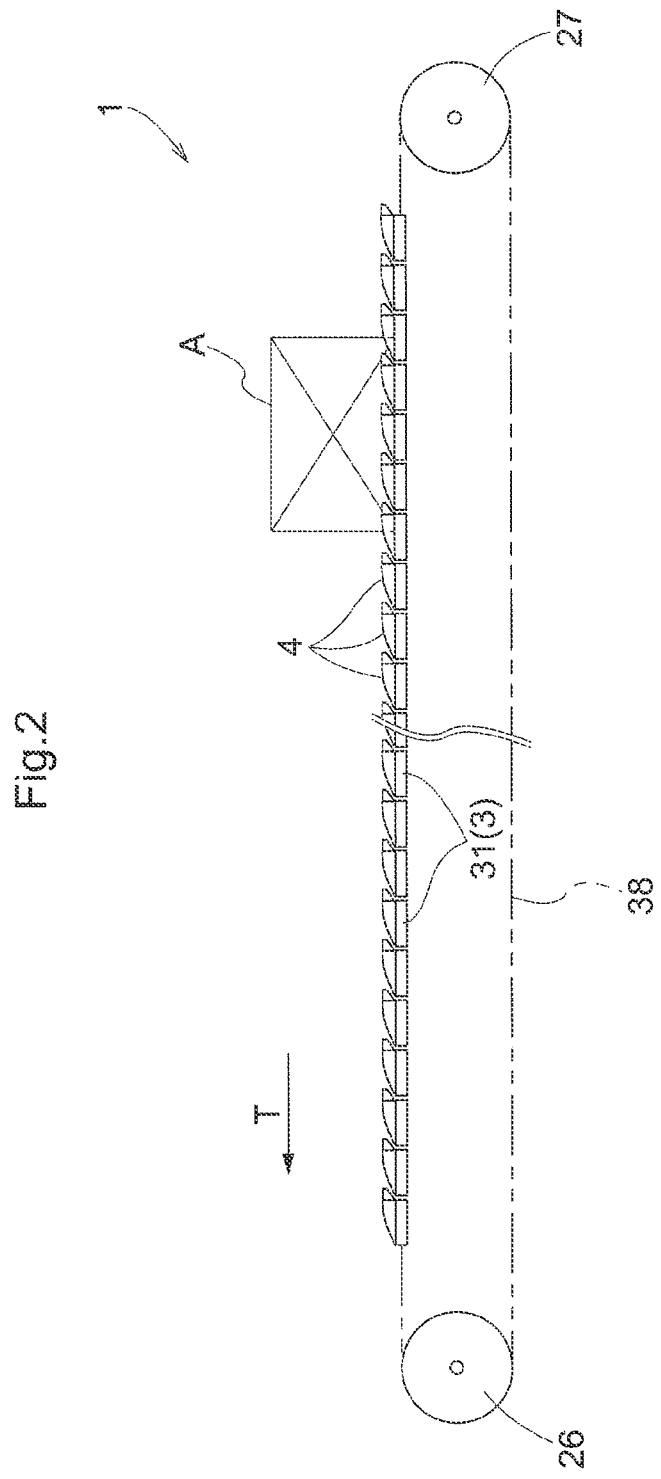
FIG. 2 is a schematic side view of the article sorting facility.

As illustrated in FIGS. 1 and 2, the article sorting facility 1 includes a support base 2, an article support 3, and an article transverse-pushing body 4. The support base 2 is disposed along a main transport direction T that is a direction to transport the articles A and is fixed to a floor face. The article support 3 is supported movably relative to the support base 2 along the main transport direction T. The article transverse-pushing body 4 is provided movably relative to the article support 3 in a width direction W perpendicular to the main transport direction T.

A branch conveyer 9 is provided outwardly from one side of the article sorting facility 1 such that the branch conveyer 9 is along an inclined transport direction C inclined from the main transport direction T. Note that the inclined transport direction C is a direction inclined outwardly as it goes toward the downstream side in the main transport direction T. The branch conveyer 9 is provided to transport a target article At that is an article A as a sorting target from among the plurality of articles A.

Figure 3:
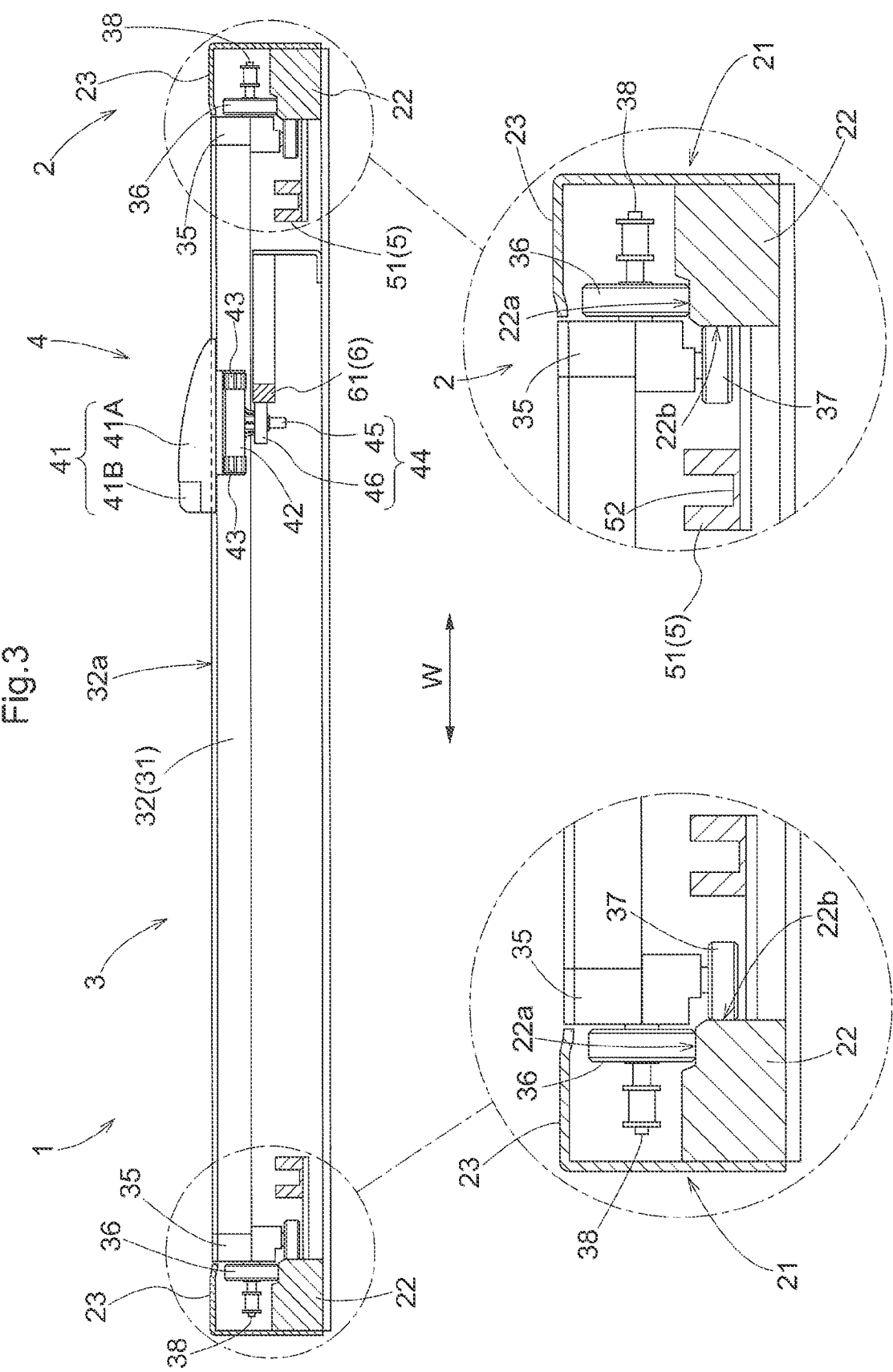
FIG. 3 is a sectional view of the article sorting facility.

As illustrated in FIG. 3, the support base 2 includes paired upper frame bodies 21 placed on the opposite sides in the width direction W. The upper frame bodies 21 form an outward path. A guide rail section 22 configured to guide movement of the article support 3 along the main transport direction T is formed in the upper frame body 21. The guide rail section 22 includes an upward guide face 22a facing upward and an inward guide face 22b facing inward. A moving roller 36 of the article support 3 rolls on the upward guide face 22a. Further, a side roller 37 of the article support 3 rolls with the side roller 37 abutting with the inward guide face 22b from inside. Further, a cover 23 is fixed to the upper frame body 21 to cover the moving roller 36 and an endless chain 38 from outside and from above.

Although not illustrated herein, the support base 2 further includes, below the upper frame bodies 21, paired lower frame bodies to form a return path, and joint members connecting the upper frame bodies 21 to their corresponding lower frame bodies.

Further, a drive sprocket 26 and a driven sprocket 27 (see FIG. 2) around which the endless chain 38 of the article support 3 is wound are rotatably supported in the support base 2. Note that the drive sprocket 26 is rotationally driven by a driving force from a driving motor. The driven sprocket 27 rotates in conjunction with the drive sprocket 26 via the endless chain 38.

The article support 3 includes a plurality of plate-shaped support members 31. As the plate-shaped support member 31, a slat can be used, for example. The plurality of plate-shaped support members 31 is disposed to be aligned along the main transport direction T and is fixed to the endless chain 38 (see FIG. 2) circling around along the main transport direction T. Hereby, the plurality of plate-shaped support members 31 constituting the article support 3 circles around along the main transport direction T in conjunction with the rotation of the drive sprocket 26 via the endless chain 38.

Figure 4:
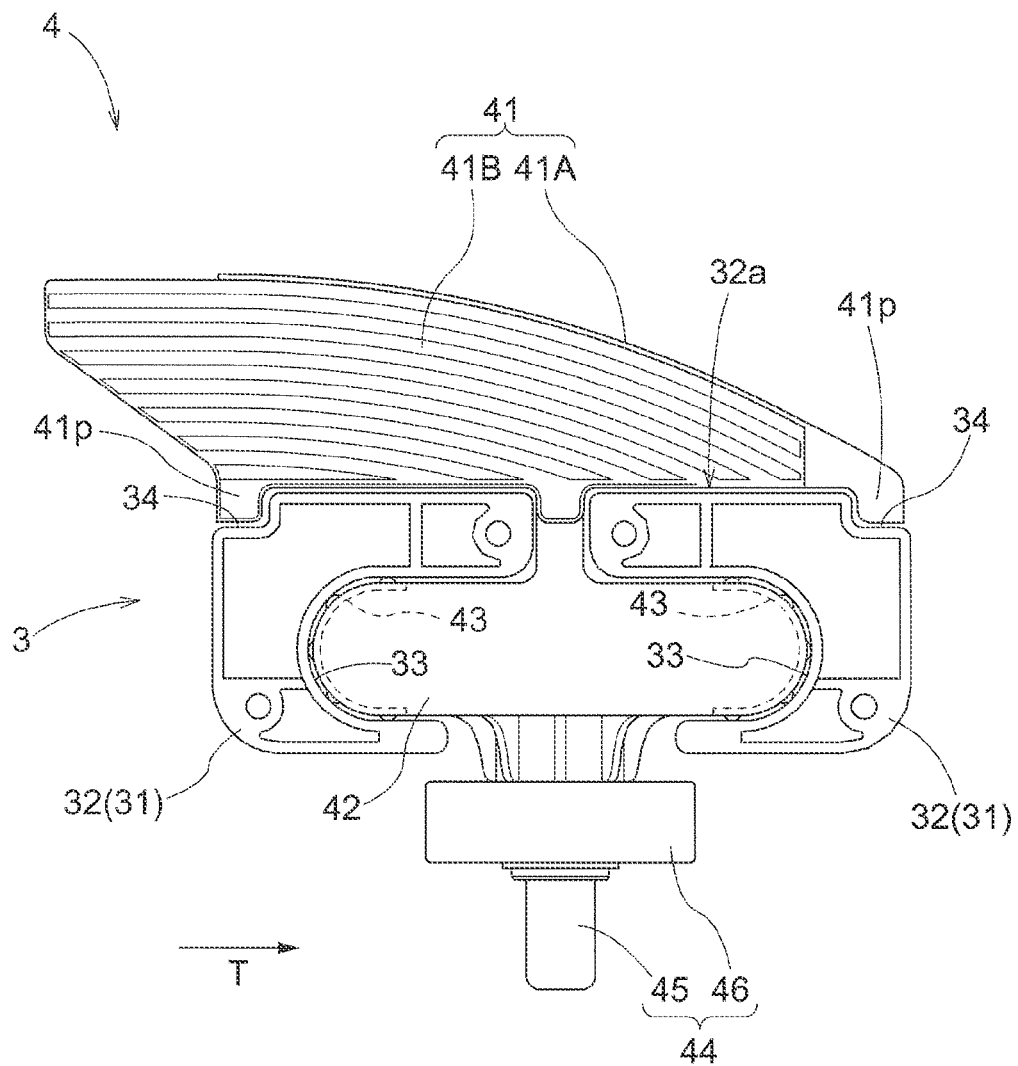
FIG. 4 is a view illustrating an assembled state of an article support and an article transverse-pushing body.

As illustrated in FIG. 4, each of the plate-shaped support members 31 includes paired support frame bodies 32. The paired support frame bodies 32 are disposed to face each other across a slight gap in the main transport direction T. The top surfaces of the support frame bodies 32 serve as a mounting surface 32a on which the article A is placed. A set of respective mounting surfaces 32a of the plurality of plate-shaped support members 31 arranged in parallel along the main transport direction T constitutes a "transport surface" moving along the main transport direction T. The article support 3 transports the article A placed on the mounting surface 32a along the main transport direction T while the article support 3 supports the article A from below.

The support frame body 32 includes a curved recess 33 and a corner groove 34. The curved recess 33 and the corner groove 34 are formed continuously in a longitudinal direction (the width direction W) such that the curved recess 33 and the corner groove 34 have respective uniform sectional shapes when they are viewed from the longitudinal direction of the support frame body 32 (the width direction W of the article sorting facility 1). In the paired support frame bodies 32, their respective curved recesses 33 are formed to face each other. The article transverse-pushing body 4 includes a sliding body 42 stored slidably over those curved recesses 33. Further, in the paired support frame bodies 32, their respective corner grooves 34 are formed at respective corners opposite from each other on the mounting surface 32a (at a corner on the upstream side in the support frame body 32 on the upstream side in the main transport direction T, and at a corner on the downstream side in the support frame body 32 on the downstream side in the main transport direction T). The article transverse-pushing body 4 includes a contact section 41 including downward protrusions 41p respectively disposed in respective corner grooves 34.

The paired support frame bodies 32 are connected to each other via connecting bodies 35. As illustrated in FIG. 3, paired connecting bodies 35 are provided to connect the paired support frame bodies 32 to each other at both sides in the width direction W. The moving roller 36 is pivotally supported by the connecting body 35 such that the moving roller 36 is rotatable around a rotating shaft along the width direction W. Further, the side roller 37 is pivotally supported by the connecting body 35 such that the side roller 37 is rotatable around a rotating axis along an up-down direction. When the plate-shaped support member 31 moves along the main transport direction T, the moving roller 36 rolls on the upward guide face 22a of the guide rail section 22, and the side roller 37 abuts with the inward guide face 22b of the guide rail section 22 from inside and rolls.

Further, the endless chain 38 as an endless rotating body is fixed to the connecting body 35. The endless chain 38 is connected to the rotating shaft of the moving roller 36.

A plurality of article transverse-pushing bodies 4 is disposed to be aligned along the main transport direction T such that each of the article transverse-pushing bodies 4 is provided slidably relative to the article support 3 in the width direction W perpendicular to the main transport direction T. In the present embodiment, each of the article transverse-pushing bodies 4 is attached to its corresponding plate-shaped support member 31 such that the each of the article transverse-pushing bodies 4 is slidable in the width direction W. As illustrated in FIGS. 3 and 4, the article transverse-pushing body 4 includes the contact section 41, the sliding body 42, and a guided section 44.

The contact section 41 is a part making contact with the target article At that is the article A as a sorting target from among the plurality of articles A. The contact section 41 is disposed above the article support 3 and slides in the width direction W to make contact with the target article At placed on the article support 3. The contact section 41 includes a block-shaped contact main body 41A formed in a predetermined shape, and a buffer member 41B fixed to the contact main body 41A. The contact main body 41A is formed in a rectangular shape in a plan view. Further, the contact main body 41A has a top surface inclined to gradually rise from the downstream side toward the upstream side in the main transport direction T and to gradually rise from a side opposite from the branch conveyer 9 in the width direction W toward the branch conveyer 9 side. The buffer member 41B is constituted by rubber, urethane, or the like, for example. The buffer member 41B is fixed to a side surface on the branch conveyer 9 side of the contact main body 41A and relaxes an impact caused at the time when the contact section 41 makes first contact with the target article At.

In the present embodiment, the contact section 41 includes the downward protrusions 41p projecting downward. The downward protrusions 41p are disposed to enter respective corner grooves 34 formed in the plate-shaped support member 31 from the upper side. The downward protrusions 41p function as a scraper, and even in a case where the target article At is thin, the downward protrusions 41p can transversely push the target article At successfully.

The sliding body 42 is connected to the contact section 41 and is disposed below the contact section 41. Further, the sliding body 42 is disposed over the curved recesses 33 of the paired support frame bodies 32 constituting the plate-shaped support member 31, the curved recesses 33 facing each other. The surface of the sliding body 42 is disposed to face the surfaces of the curved recesses 33. In a facing part of the sliding body 42 that faces its corresponding curved recess 33, a slider 43 having a plurality of projections on the surface of the slider 43 is disposed. As the slider 43, a resin slider made of resin such as ultra-high molecular weight polyethylene can be used, for example. The sliding body 42 is smoothly slidable over the plate-shaped support member 31 such that only the projections of the slider 43 make contact with the plate-shaped support member 31 (the support frame body 32) to reduce sliding resistance.

Note that, instead of the slider 43, a bearing or the like may be provided in the facing part between the sliding body 42 and the curved recess 33, for example, such that the article transverse-pushing body 4 is movable in the width direction W.

The guided section 44 is connected to the sliding body 42 and is disposed below the sliding body 42. The guided section 44 includes a support shaft 45 fixed to the contact section 41 via the sliding body 42, and a roller 46 rotatably supported by the support shaft 45. The support shaft 45 penetrates through the roller 46 to protrude downward from the roller 46. When the article transverse-pushing body 4 moves straight along the main transport direction T, the support shaft 45 is guided along a straight guide face 52a of a straight guide body 5. Further, when the advancing direction of the article transverse-pushing body 4 is changed by a sorting mechanism 7, the support shaft 45 is guided along each guide face 73c, 73d of the sorting mechanism 7. When the article transverse-pushing body 4 slides relative to the article support 3 in the width direction W, the roller 46 is guided along an inclined guide face 61a of an inclined guide body 6.

Figure 5:
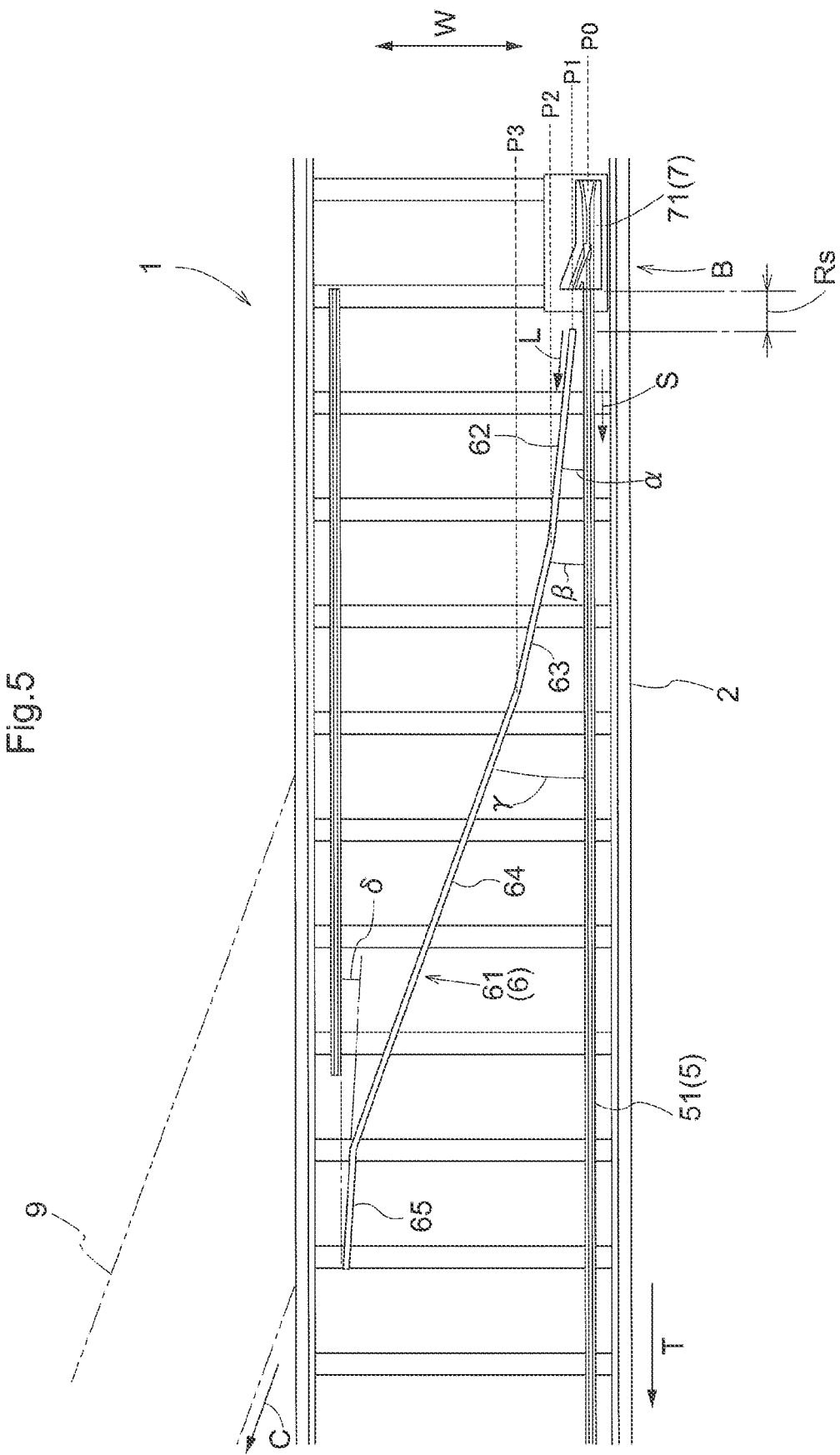
FIG. 5 is a view illustrating an arrangement of a straight guide body and an oblique guide body.

As illustrated in FIG. 5, the article sorting facility 1 further includes the straight guide body 5, the inclined guide body 6, and the sorting mechanism 7. The straight guide body 5, the inclined guide body 6, and the sorting mechanism 7 are all fixed to the support base 2.

The straight guide body 5 guides straight movement of the article transverse-pushing body 4 along the main transport direction T. As illustrated in FIG. 6, the straight guide body 5 includes the straight guide face 52a extending along the main transport direction T. The straight guide body 5 guides straight movement of the article transverse-pushing body 4 along the main transport direction T by the straight guide face 52a. In the present embodiment, the straight guide body 5 includes a straight guide rail 51 provided along the main transport direction T. On the top surface of the straight guide rail 51, a groove 52 slightly wider than the outside diameter of the support shaft 45 of the article transverse-pushing body 4 is formed. A lower end of the support shaft 45 of the article transverse-pushing body 4 enters the groove 52. A side wall surface of the groove 52 functions as the straight guide face 52a, and the straight guide face 52a is configured to guide the support shaft 45. When the support shaft 45 moves along the straight guide face 52a as such, the article transverse-pushing body 4 moves straight along the main transport direction T. Note that, in the following description, a guide path formed by the straight guide body 5 is referred to as a "straight guide path S".

The inclined guide body 6 guides slide movement of the article transverse-pushing body 4 relative to the article support 3. As illustrated in FIG. 6, the inclined guide body 6 includes the inclined guide face 61a extending along the inclined transport direction C inclined from the main transport direction T and guides the slide movement of the article transverse-pushing body 4 by the inclined guide face 61a. In the present embodiment, the inclined guide body 6 includes an inclined guide rail 61 extending along the inclined transport direction C. The inclined guide rail 61 is provided at the same height position as the roller 46 of the article transverse-pushing body 4. The inclined guide rail 61 has a side face, on the branch conveyer 9 side, that functions as the inclined guide face 61a, and the inclined guide face 61a is configured to guide the roller 46. Note that, in the following description, a guide path formed by the inclined guide body 6 is referred to as an "inclined guide path L".

As illustrated in FIG. 5, the inclined guide rail 61 includes a plurality of parts with different inclination angles relative to the straight guide rail 51 (the main transport direction T). In the present embodiment, the inclined guide rail 61 includes four parts, i.e., a first rail part 62, a second rail part 63, a third rail part 64, and a fourth rail part 65. When an inclination angle of the first rail part 62 relative to the straight guide rail 51 (the main transport direction T) is referred to as a first angle $\alpha$, an inclination angle of the second rail part 63 relative to the straight guide rail 51 (the main transport direction T) is referred to as a second angle $\beta$, an inclination angle of the third rail part 64 relative to the straight guide rail 51 (the main transport direction T) is referred to as a third angle $\gamma$, and an inclination angle of the fourth rail part 65 relative to the straight guide rail 51 (the main transport direction T) is referred to as a fourth angle $\delta$, the first angle $\alpha$ is larger than the fourth angle $\delta$, the second angle $\beta$ is larger than the first angle $\alpha$, and the third angle $\gamma$ is further larger than the second angle β. For example, it is preferable for the first angle α to be an angle set between 3° and 10°, it is preferable for the second angle β to be an angle set between 10° and 15°, it is preferable for the third angle γ to be an angle set between 15° and 25°, and it is preferable for the fourth angle δ to be an angle set between 0° and 5°.

Thus, the inclined guide body 6 (the inclined guide rail 61) is formed such that the inclination angle relative to the straight guide rail 51 (the main transport direction T) increases stepwise as a separation distance from a position corresponding to a branch part B in the width direction W (a position of the straight guide rail 51 on a side where the sorting mechanism 7 is provided) increases, except the fourth rail part 65 on the most downstream side.

Here, in the example of FIG. 5, the position corresponding to the branch part B in the width direction W (the position of the straight guide rail 51 on the side where the sorting mechanism 7 is provided) is referred to as a "reference position P0," a start position of the first rail part 62 in the width direction W is referred to as a "first position P1," and similarly, respective starts positions of the second rail part 63 and the third rail part 64 are referred to as a "second position P2" and a "third position P3." In comparison with the first rail part 62 starting from the first position P1 closest to the reference position P0, the inclination angle of the second rail part 63 starting from the second position P2 more distant from the reference position P0 than the first position P1 is set to be large (α<β). Further, in comparison with the second rail part 63, the inclination angle of the third rail part 64 starting from the third position P3 more distant from the reference position P0 than the second position P2 is set to be large (β<γ).

Note that, in a case where the inclined guide rail 61 is formed into a polygonal-line shape as such, the "inclined transport direction C" indicates a general direction, and the "inclined guide path L" also indicates a general path. Since the inclined guide rail 61 is a path along which the article transverse-pushing body 4 is directed toward the branch conveyer 9 eventually, the extending direction of the branch conveyer 9 may be regarded as the inclined transport direction C, for example.

As illustrated in FIG. 5, the sorting mechanism 7 is disposed in the branch part B between the straight guide path S and the inclined guide path L. The sorting mechanism 7 sorts the article transverse-pushing body 4 to either of a direction toward the straight guide path S and a direction toward the inclined guide path L. In the present embodiment, a region including the branch part B provided with the sorting mechanism 7 corresponds to a "sorting region."

As illustrated in FIG. 6, the sorting mechanism 7 of the present embodiment includes a block body 71. The top surface of the block body 71 has a groove having two depths formed in a stepped manner. More specifically, a shallow groove 72 is formed on the top surface of the block body 71, and a deep groove 73 is formed on the bottom surface of the shallow groove 72. The shallow groove 72 is formed to be slightly wider than the outside diameter of the roller 46 of the article transverse-pushing body 4 except an end part on the upstream side. The deep groove 73 is formed to be slightly wider than the outside diameter of the support shaft 45 of the article transverse-pushing body 4 except an end part on the upstream side. The roller 46 of the article transverse-pushing body 4 passes through the shallow groove 72, and the support shaft 45 of the article transverse-pushing body 4 passes through the deep groove 73.

Respective end parts, on the upstream side, of the shallow groove 72 and the deep groove 73 are wide open and are formed to gradually become narrow in width toward the downstream side. This makes it possible to position the article transverse-pushing body 4 reaching the sorting mechanism 7.

Further, the shallow groove 72 includes a straight shallow groove 72A formed along the main transport direction T, and a branch shallow groove 72B branching off from the straight shallow groove 72A. Similarly, the deep groove 73 includes a straight deep groove 73A formed along the main transport direction T, and a branch deep groove 73B branching off from the straight deep groove 73A. Note that, when an inclination angle of the branch shallow groove 72B relative to the straight deep groove 73A is referred to as a fifth angle ε, the fifth angle ε is set to be larger than the first angle α. Note that the fifth angle ε may have generally the same size as the third angle γ. The fifth angle ε is preferably an angle set between 15° and 30°, more preferably between 20° and 30°, for example.

Further, a swing member 74 is provided at a branch point between the straight deep groove 73A and the branch deep groove 73B. The swing member 74 is driven by a driving section including a rotary solenoid, for example, to swing with an end part of the swing member 74 on the downstream side being as a fulcrum.

As illustrated on the upper side in FIG. 6, in a case where the swing member 74 swings such that the swing member 74 is placed on the branch deep groove 73B side, the support shaft 45 of the article transverse-pushing body 4, advancing in the straight deep groove 73A, just advances in the straight deep groove 73A. At this time, the side wall surface of the straight deep groove 73A functions as a straight guide face 73c, and the straight guide face 73c is configured to guide the support shaft 45. In the meantime, as illustrated on the lower side in FIG. 6, in a case where the swing member 74 swings to be placed on the straight deep groove 73A side, the advancing direction of the support shaft 45 of the article transverse-pushing body 4, advancing in the straight deep groove 73A, is changed by the swing member 74, so that the support shaft 45 then advances in the branch deep groove 73B. At this time, the side wall surface of the branch deep groove 73B functions as a branch guide face 73d, and the branch guide face 73d is configured to guide the support shaft 45. Hereby, an initial velocity in the width direction W is given to the article transverse-pushing body 4 at the branch part B. That is, the article transverse-pushing body 4 is accelerated in the width direction W. In the example illustrated herein, the article transverse-pushing body 4 is accelerated in the width direction W by the swing member 74 at the time when the advancing direction is changed, and the article transverse-pushing body 4 is moved at a constant speed in the width direction W in a linear part of the branch deep groove 73B.

As such, the sorting mechanism 7 swings the swing member 74 to sort the support shaft 45 to either of the straight deep groove 73A and the branch deep groove 73B, so that the article transverse-pushing body 4 is sorted to either a direction toward the straight guide path S or a direction toward the inclined guide path L. In a case where the article A is advanced just straight along the main transport direction T, the article transverse-pushing body 4 is directed toward the straight guide path S. In the meantime, in a case where the article A is advanced along the inclined transport direction C, the article transverse-pushing body 4 is directed toward the inclined guide path L. A plurality of article transverse-pushing bodies 4 is assigned to one article A, and these operations are performed sequentially on the plurality of article transverse-pushing bodies 4. Hereby, the article sorting facility 1 sorts the article A by causing the course of the article A to branch at the branch part B depending on whether the article A is advanced straight along the main transport direction T or is advanced along the inclined transport direction C.

In the article sorting facility 1 according to the present embodiment, the straight guide body 5 is disposed adjacent to the sorting mechanism 7 in the main transport direction T. More specifically, the straight guide rail 51 constituting the straight guide body 5 is disposed to abut with the block body 71 constituting the sorting mechanism 7. At this time, the block body 71 and the straight guide rail 51 are provided such that the groove 52 formed in the straight guide rail 51 and the straight deep groove 73A formed in the block body 71 are directly continuous with each other along the main transport direction T. Hereby, the straight guide face 73c formed by the side wall surface of the straight deep groove 73A of the sorting mechanism 7 is linearly continuous with the straight guide face 52a formed by the side wall surface of the groove 52 of the straight guide body 5.

The inclined guide body 6 is disposed to be distanced from the sorting mechanism 7 in the main transport direction T. More specifically, the inclined guide rail 61 constituting the inclined guide body 6 is disposed to be distanced from the block body 71 constituting the sorting mechanism 7. At this time, the inclined guide face 61a formed by the side face of the inclined guide rail 61 is disposed to be distanced from the branch guide face 73d formed by the side wall surface of the branch deep groove 73B formed in the block body 71, across a separation region Rs in the main transport direction T.

Figure 7:
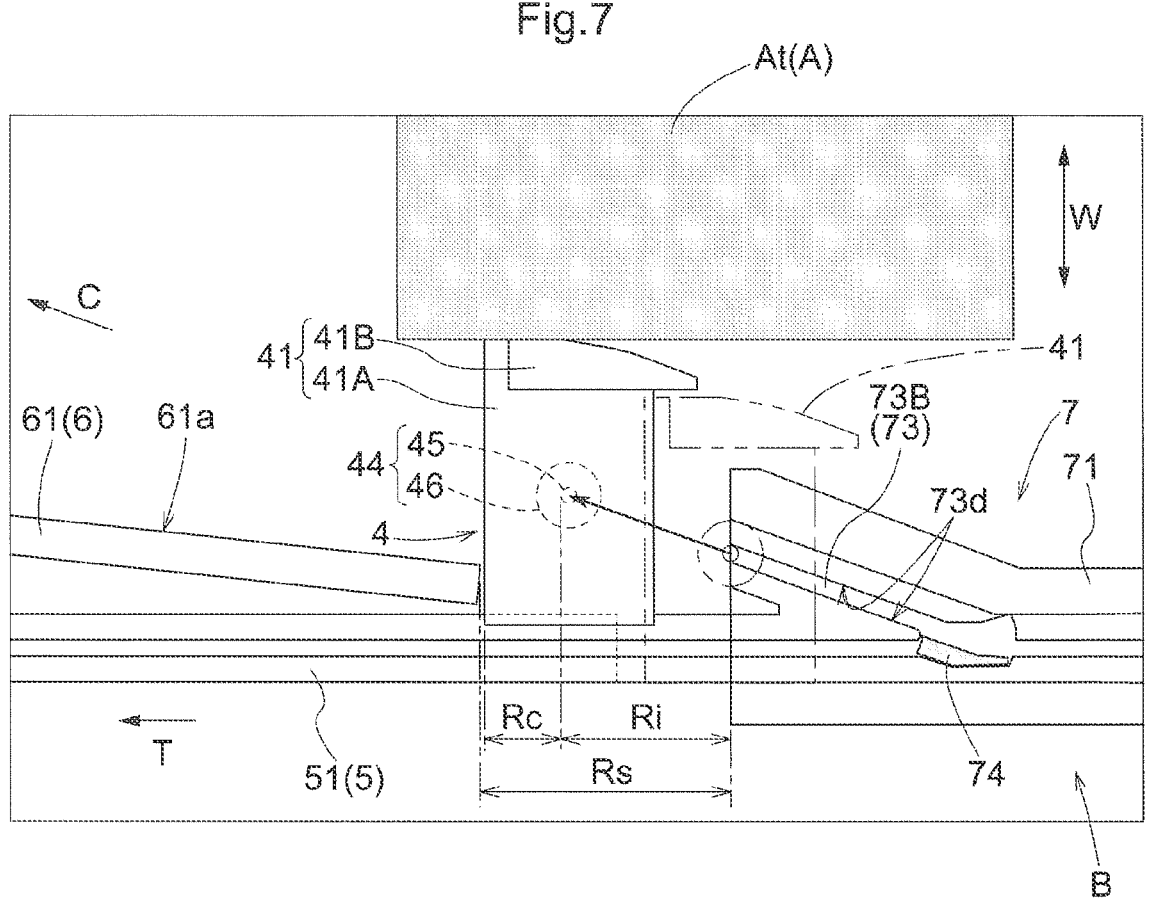
FIG. 7 is an explanatory view illustrating a state of initial contact between an article and the article transverse-pushing body.

Here, as illustrated in FIG. 7, the separation region Rs between the sorting mechanism 7 and the inclined guide body 6 is provided to include a contact start region Rc. The contact start region Rc is a region, in the main transport direction T, in which the article transverse-pushing body 4 makes first contact with the target article At as the article A targeted for sorting. With such a configuration, the article transverse-pushing body 4 released after the article transverse-pushing body 4 is accelerated in the width direction W by the sorting mechanism 7 moves inertially along the extending direction of the branch deep groove 73B in an inertial moving region Ri before the contact start region Rc. In a state where the article transverse-pushing body 4 thus moving inertially has not been guided yet by the inclined guide body 6 in the separation region Rs, the article transverse-pushing body 4 moving inertially makes first contact with the target article At as the article A targeted for sorting. Thus, the separation region Rs between the sorting mechanism 7 and the inclined guide body 6 is provided with the inertial moving region Ri where the article transverse-pushing body 4 is accelerated in the width direction W and then moved inertially in a case where the article A (the target article At) is advanced along the inclined transport direction C, and a contact region Rc where the article transverse-pushing body 4 moving inertially is brought into contact with the article A (the target article At). In the example illustrated herein, a region other than the contact start region Rc in the separation region Rs is the inertial moving region Ri.

Thus, in a case where the article A (the target article At) is advanced along the inclined transport direction C, the article transverse-pushing body 4 is accelerated in the width direction W at the branch part B and then moved inertially, and after that, the article transverse-pushing body 4 moving inertially is brought into contact with the article A (the target article At), so that the transport direction of the article A (the target article At) is inclined from the main transport direction T.

In a state where the roller 46 has not been guided yet by the inclined guide body 6, the article transverse-pushing body 4 receives no reaction force from the inclined guide body 6. In this state, the article transverse-pushing body 4 is brought into first contact with the target article At (hereinafter referred to as "guideless contact"), and hereby, a force to act on the target article At from the article transverse-pushing body 4 at the time of the first contact is restrained to be small because the article transverse-pushing body 4 receives no reaction force from the inclined guide body 6. Accordingly, even when the target article At moves in the width direction W, it is possible to avoid the target article At from falling down. Further, due to the guideless contact, even when the target article At rotates, it is possible to avoid the target article At from rotating excessively.

In the meantime, the article A includes a lightweight article Al and a heavyweight article Ah heavier than the lightweight article Al. The lightweight article Al is an article A with a weight equal to or lower than a specific reference weight, and the heavyweight article Ah is an article A heavier than the specific reference weight. In the case of guideless contact, the lightweight article Al moves farther in the width direction W than the heavyweight article Ah and rotates more greatly than the heavyweight article Ah around the up-down direction as an axis.

Figure 8:
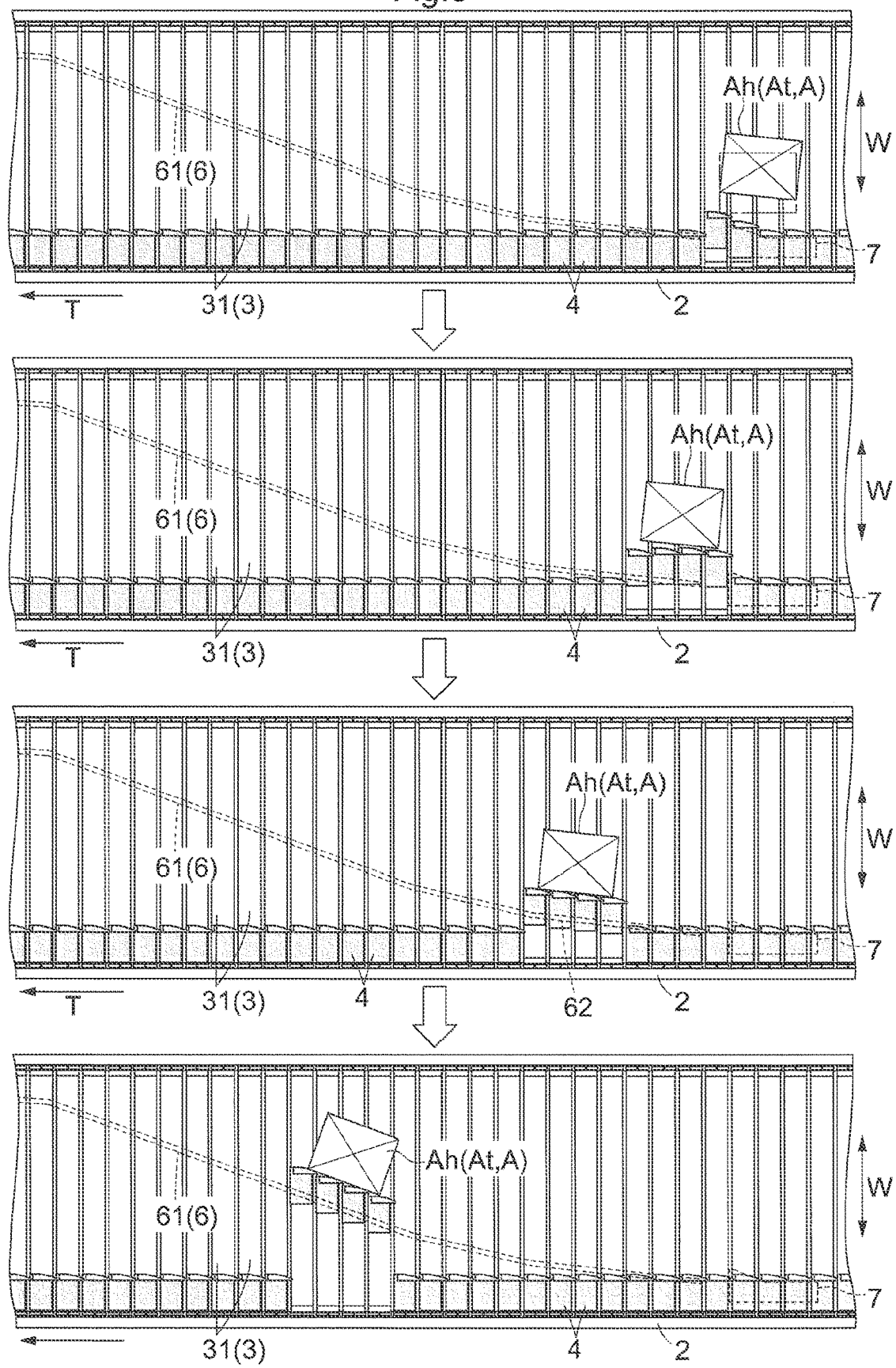
FIG. 8 is a schematic view illustrating an operation at the time when a heavyweight article is sorted.

For example, as illustrated in FIG. 8, when the article transverse-pushing body 4 makes guideless contact with the heavyweight article Ah, the heavyweight article Ah slightly moves in the width direction W and rotates by a predetermined angle around the up-down direction as an axis. In the present embodiment, the arrangement state of the first rail part 62 is set so that a moving amount in the width direction W in this case is within a projected length of the first rail part 62 in the width direction W and the rotation angle around the up-down direction as the axis is close to the inclination angle (the first angle α) of the first rail part 62. Note that the projected length of the first rail part 62 in the width direction W is a length, along the width direction W, of a region occupied by the first rail part 62 in the width direction W (the same applies to below). While the heavyweight article Ah after the guideless contact maintains its position in the width direction W, the heavyweight article Ah moves along the main transport direction T together with the article support 3. Further, the article transverse-pushing body 4 after the guideless contact and its subsequent article transverse-pushing bodies 4 move along the main transport direction T together with the article support 3 in a state where their contact sections 41 are distanced from the heavyweight article Ah and their rollers 46 are also distanced from the inclined guide rail 61.

After respective rollers 46 of such a plurality of article transverse-pushing bodies 4 come into contact with the inclined guide rail 61 (herein, the first rail part 62) eventually, the article transverse-pushing bodies 4 receive a reaction force from the inclined guide body 6 and press and slide the heavyweight article Ah in the width direction W. At this time, since the rotation angle of the heavyweight article Ah is close to the inclination angle (the first angle α) of the first rail part 62, the plurality of article transverse-pushing bodies 4 guided by the inclined guide body 6 makes contact with the heavyweight article Ah generally at the same time and slides the heavyweight article Ah with the heavyweight article Ah being supported by the whole surfaces of the plurality of article transverse-pushing bodies 4. Accordingly, it is possible to relax an impact caused at the time of the first contact between the heavyweight article Ah and the article transverse-pushing bodies 4 guided by the inclined guide body 6 after the guideless contact.

Figure 9:
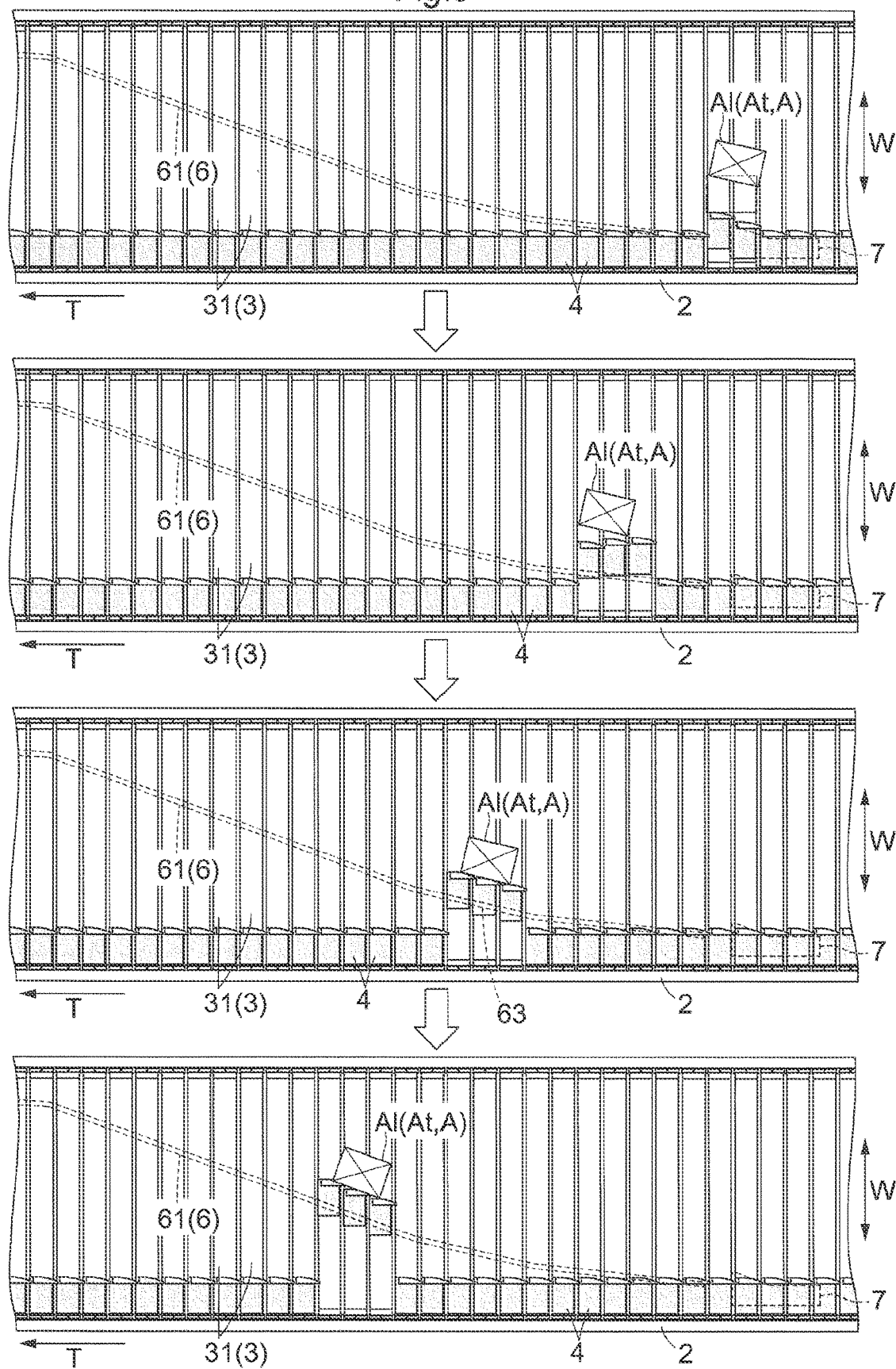
FIG. 9 is a schematic view illustrating an operation at the time when a lightweight article is sorted.

Further, as illustrated in FIG. 9, for example, when the article transverse-pushing body 4 makes guideless contact with the lightweight article Al, the lightweight article Al moves farther in the width direction W in comparison with the heavyweight article Ah and rotates only by a larger angle around the up-down direction as an axis. In the present embodiment, the arrangement state of the second rail part 63 is set such that the moving amount in the width direction W in this case is within a projected length as the sum of the first rail part 62 and the second rail part 63 in the width direction W, and the rotation angle around the up-down direction as the axis is close to the inclination angle (the second angle β) of the second rail part 63. While the lightweight article Al after the guideless contact maintains its position in the width direction W, the lightweight article Al moves along the main transport direction T together with the article support 3. Further, the article transverse-pushing body 4 after the guideless contact and its subsequent article transverse-pushing bodies 4 move along the main transport direction T together with the article support 3 in a state where their contact sections 41 are distanced from the lightweight article Al and their rollers 46 are also distanced from the inclined guide rail 61.

After respective rollers 46 of such a plurality of article transverse-pushing bodies 4 come into contact with the inclined guide rail 61 (herein, the second rail part 63) eventually, the article transverse-pushing bodies 4 receive a reaction force from the inclined guide body 6 and press and slide the lightweight article Al in the width direction W. At this time, since the rotation angle of the lightweight article Al is close to the inclination angle (the second angle β) of the second rail part 63, the plurality of article transverse-pushing bodies 4 guided by the inclined guide body 6 makes contact with the lightweight article Al generally at the same time and slides the lightweight article Al with the lightweight article Al being supported by the whole surfaces of the plurality of article transverse-pushing bodies 4. Accordingly, it is possible to relax an impact caused at the time of the first contact between the lightweight article Al and the article transverse-pushing bodies 4 guided by the inclined guide body 6 after the guideless contact.

Note that, in a case where the rotation angle of the heavyweight article Ah is the same as the inclination angle (the first angle α) of the first rail part 62, the plurality of article transverse-pushing bodies 4 guided by the inclined guide body 6 makes contact with the heavyweight article Ah at the same time, and in a case where the rotation angle of the heavyweight article Ah is different from the inclination angle (the first angle α) of the first rail part 62, the plurality of article transverse-pushing bodies 4 sequentially makes contact with the heavyweight article Ah. Similarly, in a case where the rotation angle of the lightweight article Al is the same as the inclination angle (the second angle β) of the second rail part 63, the plurality of article transverse-pushing bodies 4 guided by the inclined guide body 6 makes contact with the lightweight article Al at the same time, and in a case where the rotation angle of the lightweight article Al is different from the inclination angle (the second angle β) of the second rail part 63, the plurality of article transverse-pushing bodies 4 sequentially makes contact with the lightweight article Al.

Other Embodiments (1) The above embodiment describes, as an example, a configuration in which the article support 3 includes a plurality of plate-shaped support members 31 (more specifically, slats). However, the present invention is not limited to such a configuration, and the article support 3 may be constituted by a plurality of tubular support members (pipes), for example. Alternatively, the article support 3 may be constituted by an endless belt, for example.

(2) The above embodiment describes, as an example, a configuration in which the article transverse-pushing body 4 is slidable in a state where the article transverse-pushing body 4 is stored between the paired support frame bodies 32 constituting the plate-shaped support member 31. However, the present invention is not limited to such a configuration, and as the slide structure of the article transverse-pushing body 4 relative to the article support 3, a given structure can be employed, e.g., a structure in which the article transverse-pushing body 4 is slidable in a state where the article transverse-pushing body 4 is engaged outwardly with the plate-shaped support member 31.

(3) The above embodiment describes, as an example, a configuration in which the inclined guide body 6 (the inclined guide rail 61) includes four parts having different inclination angles. However, the present invention is not limited to such a configuration, and the number of parts having different inclination angles may be three or less or may be five or more. Further, at least part (for example, a part from the first rail part 62 to the third rail part 64 in the above embodiment) of the inclined guide body 6 (the inclined guide rail 61) may include a curved part such as an arcuate part.

(4) The above embodiment describes, as an example, a configuration in which the articles A are sorted to the lightweight article Al and the heavyweight article Ah, and the arrangement form of the inclined guide body 6 (the inclined guide rail 61) is set in consideration of the behaviors of these two types of articles after guideless contact. However, the present invention is not limited to such a configuration, and for example, the articles A may be sorted to three or more types in accordance with their weights, and the arrangement form of the inclined guide body 6 (the inclined guide rail 61) may be set in consideration of the behaviors of these three or more types of articles after guideless contact.

(5) The above embodiment describes, as an example, a configuration in which the whole side face of the inclined guide body 6 (the inclined guide rail 61) serves as the inclined guide face 61a, and the whole inclined guide body 6 (the inclined guide rail 61) is disposed to be distanced from the sorting mechanism 7 in the main transport direction T. However, the present invention is not limited to such a configuration, and the inclined guide body 6 (the inclined guide rail 61) may include a non-guide face that does not guide the article transverse-pushing body 4, other than the inclined guide face 61a. In such a case, if at least the inclined guide face 61a is distanced from the sorting mechanism 7 in the main transport direction T, the inclined guide body 6 (the inclined guide rail 61) itself may be disposed adjacent to (furthermore, continuous with) the sorting mechanism 7.

(6) The above embodiment describes, as an example, a configuration in which the separation region Rs between the sorting mechanism 7 and the inclined guide body 6 is provided to fully contain the contact start region Rc. However, the present invention is not limited to such a configuration, and the separation region Rs should contain at least part of the contact start region Rc, as long as the first contact between the article transverse-pushing body 4 and the target article At is guideless contact.

(7) The above embodiment describes, as an example, a configuration in which the sorting mechanism 7 includes the swingable swing member 74 and mechanically sorts the advancing direction of the article transverse-pushing body 4. However, the present invention is not limited to such a configuration, and the support shaft 45 of the article transverse-pushing body 4 may be made of a ferromagnetic material, and the sorting mechanism 7 may include an electromagnet and a permanent magnet, so that the advancing direction of the article transverse-pushing body 4 may be sorted electromagnetically, for example.

(8) The configurations described in the embodiments (including the above embodiment and other embodiments; the same applies hereinafter) can be applied in combination with configurations of other embodiments as long as no inconsistency occurs. In terms of the other configurations, the embodiments disclosed in the present specification are just examples in all respects, and various modifications can be made appropriately within a range that does not deviate from the gist of this disclosure.

Overview of Embodiment

The following is an overview of the above description. That is, the article sorting method according to this disclosure preferably includes the following configurations.

The article sorting method according to this disclosure is an article sorting method for sorting an article transported along a main transport direction by selectively advancing the article along an inclined transport direction inclined from the main transport direction in a predetermined sorting region, and the article sorting method includes, in a case where the article is advanced along the inclined transport direction by use of an article transverse-pushing body configured to move along the main transport direction and to be movable in a width direction perpendicular to the main transport direction, accelerating the article transverse-pushing body in the width direction in the sorting region to inertially move the article transverse-pushing body such that the article transverse-pushing body thus moving inertially is brought into contact with the article.

In this configuration, in a case where the article is advanced along the inclined transport direction, the article transverse-pushing body moving inertially but not guided by the inclined guide body yet is brought into contact with the article, so that the article transverse-pushing body makes contact with the article in a state where the article transverse-pushing body receives no reaction force from the inclined guide body. Because of this, a force to act on the article from the article transverse-pushing body at the time of first contact is restrained to be small, thereby making it possible to avoid the article from falling down or rotating excessively.

As one aspect, it is preferable that, in a case where the article is advanced along the inclined transport direction by use of a plurality of article transverse-pushing bodies aligned along the main transport direction, the plurality of article transverse-pushing bodies be sequentially brought into contact with one article.

In this configuration, with the plurality of article transverse-pushing bodies, the article can be sorted by sliding the article in the width direction while the article is stably supported.

As one aspect, it is preferable that, in a case where the article is advanced along the inclined transport direction by use of an inclined guide body having a part where an inclination angle from the main transport direction increases as a separation distance from a position corresponding to the sorting region in the width direction increases, the advance of the article transverse-pushing body along the inclined transport direction after the article transverse-pushing body has made contact with the article be guided by the inclined guide body.

For example, when a relatively light article makes first contact with the article transverse-pushing body moving inertially, the relatively light article moves more largely in the width direction and rotates more greatly around the up-down direction as an axis in comparison with a relatively heavy article. In consideration of this, if the inclined guide body is configured as described above, it is possible to relax an impact caused when the article transverse-pushing body guided by the inclined guide body is brought into contact with the article again after the first contact between the article transverse-pushing body moving inertially and the article, regardless of the weight of the article.

Further, the article sorting facility according to this disclosure preferably includes the following configurations.

The article sorting facility according to this disclosure is an article sorting facility for sorting an article by causing a course for the article to branch in a predetermined sorting region depending on whether the article is advanced straight along a main transport direction or advanced along an inclined transport direction inclined from the main transport direction, and the article sorting facility includes: an article support forming a transport surface moving along the main transport direction and configured to support the article placed on the transport surface; and a plurality of article transverse-pushing bodies disposed to be aligned along the main transport direction such that each of the article transverse-pushing bodies is provided movably relative to the article support in a width direction perpendicular to the main transport direction. In a case where the article is advanced along the inclined transport direction, the article transverse-pushing bodies are accelerated in the width direction in the sorting region and then moved inertially such that the article transverse-pushing bodies thus moving inertially are brought into contact with the article.

With this configuration, in a case where the article is advanced along the inclined transport direction, the article transverse-pushing body moving inertially but not guided by the inclined guide body yet is brought into contact with the article, so that the article makes contact with the article transverse-pushing body in a state where the article transverse-pushing body receives no reaction force from the inclined guide body. Because of this, a force to act on the article from the article transverse-pushing body at the time of first contact is restrained to be small, thereby making it possible to avoid the article from falling down or rotating excessively.

As one aspect, it is preferable that the article sorting facility further include: a straight guide body configured to guide straight movement of the article transverse-pushing bodies along the main transport direction; an inclined guide body configured to guide movement of the article transverse-pushing bodies along an inclined transport direction inclined from the main transport direction; and a sorting mechanism disposed in a branch part between a guide path formed by the straight guide body and a guide path formed by the inclined guide body and configured to sort the article transverse-pushing bodies to advance the article transverse-pushing bodies straight along the straight guide body or advance the article transverse-pushing bodies along the inclined guide body. It is preferable that, in a case where the sorting mechanism advances the article transverse-pushing bodies along the inclined guide body, the article transverse-pushing bodies be accelerated in the width direction and then moved inertially.

With this configuration, it is possible to successfully achieve a configuration in which the article transverse-pushing body is accelerated in the width direction by the sorting mechanism. Further, by disposing the inclined guide body to be distanced from the sorting mechanism in the main transport direction or by setting the inclination angle on the upstream side of the inclined guide body to be small, for example, it is possible to successfully achieve a configuration in which the article transverse-pushing body is accelerated in the width direction and then moved inertially.

The article sorting method and the article sorting facility according to this disclosure should be able to yield at least one of the above effects.

DESCRIPTION OF REFERENCE NUMERALS 1 article sorting facility
3 article support
4 article transverse-pushing body
5 straight guide body
6 inclined guide body
7 sorting mechanism
32a mounting surface (transport surface)
51 straight guide rail
61 inclined guide rail
62 first rail part
63 second rail part
64 third rail part
65 fourth rail part
71 block body
72 shallow groove
72A straight shallow groove
72B branch shallow groove
73 deep groove
73A straight deep groove
73B branch deep groove
74 swing member
A article
Al lightweight article
Ah heavyweight article
B branch part (sorting region)
S straight guide path (guide path constituted by straight guide body)
L inclined guide path (guide path constituted by inclined guide body)
T main transport direction
C inclined transport direction
W width direction
α first angle
β second angle
γ third angle

The invention claimed is:

1. An article sorting method for sorting an article transported along a main transport direction by selectively advancing the article along an inclined transport direction inclined from the main transport direction in a predetermined sorting region, the article sorting method comprising:
in a case where the article is advanced along the inclined transport direction by use of an article transverse-pushing body configured to move along the main transport direction and to be movable in a width direction perpendicular to the main transport direction, accelerating the article transverse-pushing body in the width direction in the sorting region to inertially move the article transverse-pushing body such that the article transverse-pushing body thus moving inertially is brought into contact with the article,
wherein, in a case where the article is advanced along the inclined transport direction, the article transverse-pushing bodies are accelerated in the width direction in the sorting region and subsequently moved inertially while being not guided by the inclined guide body such that the article transverse-pushing bodies thus moving inertially are brought into contact with the article and subsequently the advance of the article transverse-pushing body along the inclined transport direction is guided by an inclined guide body extending along the inclined transport direction inclined from the main transport direction.

2. The article sorting method according to claim 1, wherein, in a case where the article is advanced along the inclined transport direction by use of a plurality of article transverse-pushing bodies aligned along the main transport direction, the plurality of article transverse-pushing bodies is brought into contact with one article.

3. The article sorting method according to claim 1, wherein, in a case where the article is advanced along the inclined transport direction by use of an inclined guide body having a part where an inclination angle from the main transport direction increases as a separation distance from a position corresponding to the sorting region in the width direction increases, the advance of the article transverse-pushing body along the inclined transport direction after the article transverse-pushing body has made contact with the article is guided by the inclined guide body.

4. The article sorting method according to claim 1, wherein when the article transverse-pushing bodies are not guided by the inclined guide body, the article transverse-pushing bodies do not make contact with the inclined guide body.

5. An article sorting facility for sorting an article by causing a course for the article to branch in a predetermined sorting region depending on whether the article is advanced straight along a main transport direction or advanced along an inclined transport direction inclined from the main transport direction, the article sorting facility comprising:
an inclined guide body extending along the inclined transport direction inclined from the main transport direction;
an article support forming a transport surface moving along the main transport direction and configured to support the article placed on the transport surface; and
a plurality of article transverse-pushing bodies disposed to be aligned along the main transport direction such that each of the article transverse-pushing bodies is provided movably relative to the article support in a width direction perpendicular to the main transport direction,
wherein in a case where the article is advanced along the inclined transport direction, the article transverse-pushing bodies are accelerated in the width direction in the sorting region to be moved inertially such that the article transverse-pushing bodies thus moving inertially are brought into contact with the article, and
wherein, in a case where the article is advanced along the inclined transport direction, the article transverse-pushing bodies are accelerated in the width direction in the sorting region and subsequently moved inertially while being not guided by the inclined guide body such that the article transverse-pushing bodies thus moving inertially are brought into contact with the article and subsequently the advance of the article transverse-pushing body along the inclined transport direction is guided by the inclined guide body.

6. The article sorting facility according to claim 5, further comprising:
   a straight guide body configured to guide straight movement of the article transverse-pushing bodies along the main transport direction;
   an inclined guide body configured to guide movement of the article transverse-pushing bodies along an inclined transport direction inclined from the main transport direction; and
   a sorting mechanism disposed in a branch part between a guide path formed by the straight guide body and a guide path formed by the inclined guide body and configured to sort the article transverse-pushing bodies to advance the article transverse-pushing bodies straight along the straight guide body or advance the article transverse-pushing bodies along the inclined guide body, and
   wherein in a case where the sorting mechanism advances the article transverse-pushing bodies along the inclined guide body, the article transverse-pushing bodies are accelerated in the width direction and then moved inertially.

7. The article sorting facility according to claim 6, wherein the inclined guide body is disposed to be distanced from the sorting mechanism in the main transport direction.

8. The article sorting facility according to claim 5, wherein when the article transverse-pushing bodies are not guided by the inclined guide body, the article transverse-pushing bodies do not make contact with the inclined guide body.

* * * * *

UNITED STATES PATENT AND TRADEMARK OFFICE
CERTIFICATE OF CORRECTION

| | |
|---|---|
| PATENT NO. | : 12,448,225 B2 |
| APPLICATION NO. | : 18/281741 |
| DATED | : October 21, 2025 |
| INVENTOR(S) | : Namikawa et al. |

Page 1 of 1

It is certified that error appears in the above-identified patent and that said Letters Patent is hereby corrected as shown below:

In the Claims

Column 16, Line 3, Claim 1, delete "article," and insert -- article; and an inclined guide body extending along the inclined transport direction inclined from the main transport direction, --

Column 16, Line 13, Claim 1, delete "an" and insert -- the --

Column 16, Lines 13-15, Claim 1, delete "body extending along the inclined transport direction inclined from the main transport direction." and insert -- body. --

Signed and Sealed this
Tenth Day of February, 2026

John A. Squires
*Director of the United States Patent and Trademark Office*